United States Patent
Vyrros et al.

(10) Patent No.: US 8,942,115 B2
(45) Date of Patent: Jan. 27, 2015

(54) SYSTEM AND METHOD FOR DYNAMIC ROUTING FOR PUSH NOTIFICATIONS

(75) Inventors: Andrew H. Vyrros, San Francisco, CA (US); Darryl N. Bleau, Campbell, CA (US); Jeffrey T. Davey, San Jose, CA (US); Justin N. Wood, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 628 days.

(21) Appl. No.: 13/224,581

(22) Filed: Sep. 2, 2011

(65) Prior Publication Data

US 2012/0307656 A1  Dec. 6, 2012

Related U.S. Application Data

(60) Provisional application No. 61/492,893, filed on Jun. 3, 2011.

(51) Int. Cl.

| | |
|---|---|
| H04W 40/12 | (2009.01) |
| H04W 4/20 | (2009.01) |
| H04L 12/18 | (2006.01) |
| H04L 12/58 | (2006.01) |
| H04L 29/08 | (2006.01) |

(52) U.S. Cl.
CPC ............. *H04W 4/20* (2013.01); *H04L 12/1859* (2013.01); *H04L 51/38* (2013.01); *H04L 67/322* (2013.01); *H04L 67/26* (2013.01)
USPC ........................................................ 370/252

(58) Field of Classification Search
CPC ... H04L 12/1859; H04L 51/38; H04L 67/322; H04L 67/26; H04W 4/20
USPC .................... 370/252, 331, 338, 352; 455/466
See application file for complete search history.

(56) References Cited

U.S. PATENT DOCUMENTS

| | | | |
|---|---|---|---|
| 7,254,614 B2 | 8/2007 | Mulligan et al. | |
| 8,064,896 B2 | 11/2011 | Bell et al. | |
| 2003/0095540 A1* | 5/2003 | Mulligan et al. | 370/352 |
| 2006/0133335 A1* | 6/2006 | Garcia-Martin | 370/338 |
| 2006/0265489 A1 | 11/2006 | Moore | |
| 2010/0227632 A1 | 9/2010 | Bell | |
| 2011/0069676 A1* | 3/2011 | Perras et al. | 370/331 |

FOREIGN PATENT DOCUMENTS

EP        1523154 A1    4/2005

OTHER PUBLICATIONS

International Search Report and Written Opinion from foreign counterpart PCT Application Serial No. PCT/US2012/040427, mailed Aug. 28, 2012, 11 pages.

* cited by examiner

*Primary Examiner* — Pao Sinkantarakorn
*Assistant Examiner* — Richard Chang
(74) *Attorney, Agent, or Firm* — Park, Vaughan, Fleming & Dowler LLP

(57) ABSTRACT

A system and method are described for dynamically routing push notifications to users over the most efficient network path. For example, in one embodiment, presence information associated with a device of a user is monitored. The presence information indicates whether the first device is currently connected to a wireless network and a current network location of the device. The channel quality for packets transmitted between the first device and a first gateway and between the first device and a second gateway is also monitored and is used to select between the first and second gateways when transmitting push notifications.

21 Claims, 8 Drawing Sheets

SYSTEM AND METHOD FOR DYNAMIC ROUTING FOR PUSH NOTIFICATIONS

CLAIM TO PRIORITY

This application claims the benefit of the filing date under 35 U.S.C. §119(e), of the U.S. Provisional Application No. 61/492,893, filed on Jun. 3, 2011.

BACKGROUND

1. Field of the Invention

This invention relates generally to the field of mobile device processing; and more specifically, to the management of notification messages transmitted between mobile devices and application providers.

2. Description of the Related Art

Users of the mobile devices (laptops, palmtops, mobile phones, smart phones, multimedia phones, portable media players, GPS units, mobile gaming systems, etc.) may have applications installed that periodically receive notification messages from notification services. For example, such applications include "push" e-mail services (e.g., MobileMe, Microsoft Exchange, ActiveSync, Push-IMAP, Yahoo! Push, etc.), or other push services (e.g., update/upgrade services, news services, web blog services, podcast services, social networking services, or other types of services where notification messages may be sent). Notification messages typically represent events of interest, which are typically defined by the applications (e.g., new e-mail indicator, new news item indicator, new podcast indicator, change of on-line status of a social networking friend, etc.).

The increase in the use of mobile devices magnifies the complexity of routing notification messages to those devices. One problem is that mobile devices are not inherently addressable; for example, there is currently no mobile version of IPv6. In other words, mobile devices do not have their own IP addresses in the same way that a desktop computer, or even a laptop computer, has an IP address. Furthermore, mobile devices are sometimes logically behind a service provider firewall that likely employs network address translation (NAT). Such firewalls are applicable both within the cellular context and the wi-fi context. Given that mobile devices are not inherently addressable, it is difficult to route messages to a mobile device, particularly on a large scale.

Scalability becomes a particular issue within the context of notification messages sent to mobile devices as the number of mobile devices connected to a network increases. For example, a network device that connects to mobile devices can typically manage device connections for thousands of mobile devices at a time. Thus, to accommodate hundreds of millions of mobile devices would require hundreds of thousands of network server devices to manage the connections and the routing of messages to those hundreds of millions of devices. Of course, hundreds of thousands of network server devices would be both cost prohibitive and very complex to implement. Additionally, static routing of messages using network server devices are often not failsafe or fault tolerant, meaning that if a network device goes down, it is possible that notification messages will not be able to reach certain mobile devices.

BRIEF DESCRIPTION OF THE DRAWINGS

A better understanding of the present invention can be obtained from the following detailed description in conjunction with the following drawings, in which.

SUMMARY

A system and method are described for dynamically routing push notifications to users over the most efficient network path. For example, in one embodiment, presence information associated with a device of a user is monitored. The presence information indicates whether the first device is currently connected to a wireless network and a current network location of the device. The channel quality for packets transmitted between the first device and a first gateway and between the first device and a second gateway is also monitored and is used to select between the first and second gateways when transmitting push notifications.

DETAILED DESCRIPTION

Embodiments of a Push Notification Service

Embodiments of the invention may be implemented within the context of a push notification service. One such service, which has been designed by the assignee of the present application, is described in co-pending U.S. Patent Application No. 2010/0227632, Filed Jun. 5, 2009, entitled Push Notification Service. An overview of the push notification service is provided below, followed by a detailed description of a system and method for implementing two-way push notifications and a system and method for dynamic routing.

Figure 1:
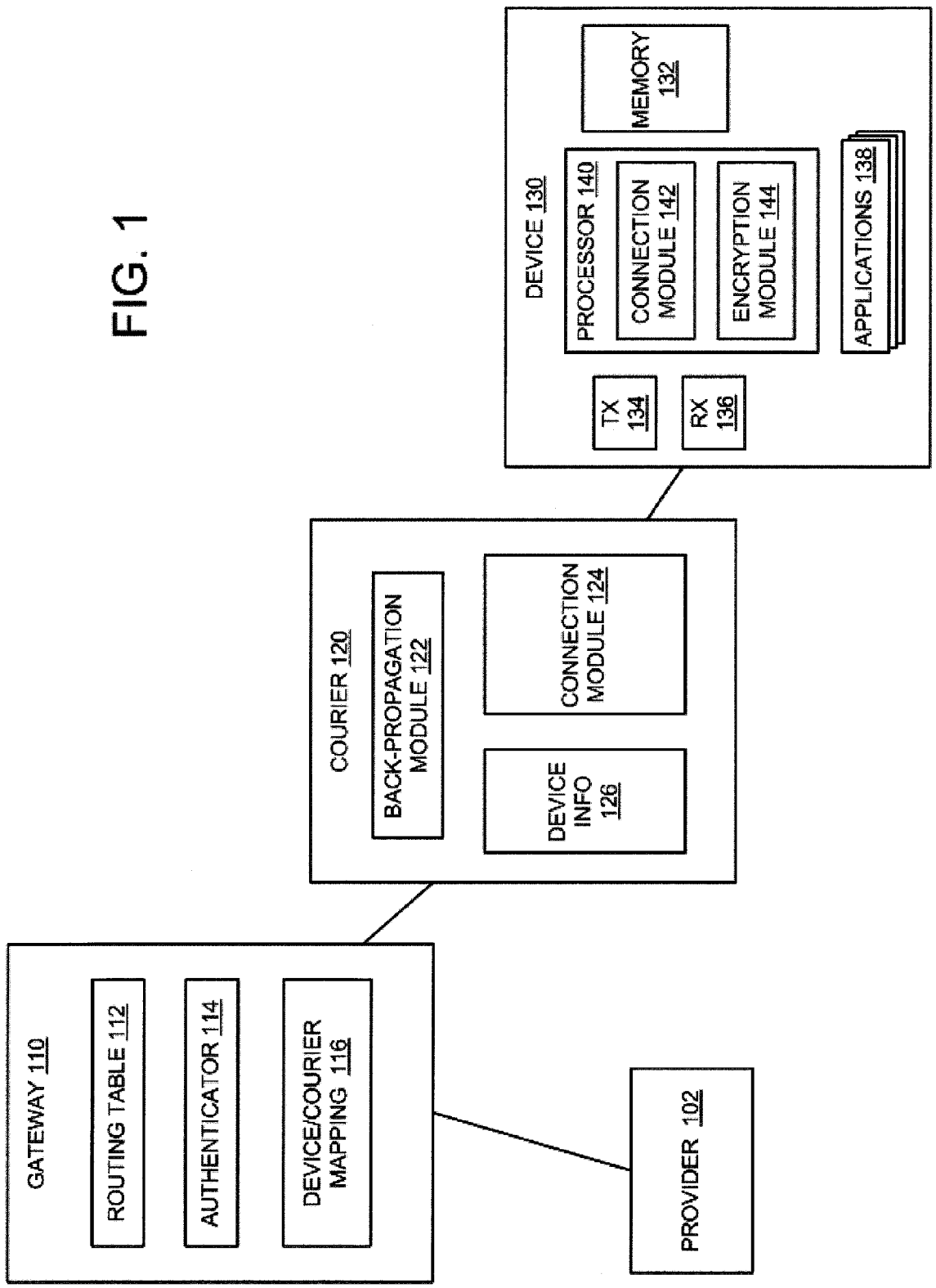
FIG. 1 is a block diagram illustrating a system according to various embodiments.

FIG. 1 is a block diagram according to various embodiments. Forwarding a notification message from a provider 102 to a mobile device 130 requires at least one gateway 110 and one courier 120. Gateway 110 receives notification messages (e.g., push messages) from provider 102. In various embodiments, provider 102 sends an authentication Secure Sockets Layer (SSL) certificate upon an initial connection with gateway 110. This SSL certificate can be configured with additional user-defined data. Other secure communications protocols (e.g., cryptographic protocols such as Transport Layer Security (TLS), etc.) can be used in other embodiments. Authenticator 114 uses any additional user-defined data to identify the provider 102 in a trusted fashion.

Where a provider associated with a particular application (e.g., Twitter) includes additional identifying (e.g., user-defined) data within the SSL certificate, gateway 110 can not only authenticate the provider, but also automatically provision push service for the provider and the application (e.g., Twitter). In other words, gateway 110 can automatically extract any additional identifying data from the authentication certificate and attach the additional identifying data (or a portion of the data) to messages (e.g., push-notification messages). In some embodiments, the additional identifying data may identify a topic or feed associated with the provider (or an application of the provider) to which a user might subscribe. Thus, the additional information in the authentication certificate can be leveraged to direct messages to mobile devices that have subscribed to the topic/feed or requested information regarding the topic/feed. In this way, push service is automatically provisioned for the provider.

Having received a notification message from an authenticated provider 102, gateway 110 determines the destination zone for the notification message. The destination zone is included within a token that is sent along with the notification message. In some embodiments, it is not necessary to send the zone information as part of a token. By extracting the zone from the token or otherwise obtaining the zone information, gateway 110 determines whether the destination zone matches the zone maintained/managed by gateway 110. So, for example, if gateway 110 is responsible for zone 5, then all messages received from a provider having the destination zone 5 can be forwarded to a courier by gateway 110. However, if gateway 110, which is responsible for zone 5, receives a message whose destination zone is zone 8, then gateway 110 must route the notification message to the gateway that is responsible for zone 5.

Routing table 112 is used to route messages from one gateway to another gateway. In various embodiments, DNS (domain name service) is used to route messages between gateways. However, other routing protocols could be used in other embodiments. Thus, when a message is received at gateway 110, gateway 110 determines whether it is the appropriate gateway to forward the message. If not, gateway 110 performs a routing table lookup of routing table 112 to determine the appropriate gateway to forward the message. In some embodiments, the DNS lookup itself is used to determine whether the gateway is the appropriate gateway for forwarding the notification message.

In cases where gateway 110 receives a message having a particular destination zone that matches the zone managed by gateway 110, then gateway 110 can forward that message directly to the appropriate courier device using a device/courier mapping 116. Gateway 110 receives this mapping information from various couriers, which will be explained in more detail below. Zones are dynamically assigned to gateways. In other words, gateway 110 might manage notification messages for one zone for a period of time and then be switched, or reconfigured, to manage the forwarding of messages for a different zone at a later time.

Courier 120, similar to gateway 110, is a network device. Courier 120 includes a connection module 124, a back-propagation module 122, and maintains device information 126. Courier 120 can, in some embodiments, manage connections for upwards of 1.6 million devices. Couriers are not limited to connecting with devices of a particular zone. In other words, courier 220 can manage device connections where various connected devices belong to different zones.

When a device initially connects with courier 120, courier 120 provisions a zone for the device. In various embodiments, the zone provisioned for the device is permanent. Despite the particular zone assignment for each device, devices may lose their connection with courier 120 for various reasons. For example, a connection might be lost due to loss of cellular signal, or wi-fi signal, loss of power, or because the mobile device has changed geographic locations, etc. When a mobile device attempts to reconnect to the system and connect with a courier, the device can connect with any courier on the network. In this way, courier 120 can be connected to devices assigned to different zones.

As mentioned above, courier 120 maintains device information 126 for each device with which it is connected. Device information can include a zone identifier for the device, a unique device identifier (UID) for the device, and other device information. Connection module 124 is used to establish connections between courier 120 and various devices.

Courier 120 also includes a back-propagation module 122. Back-propagation module 122 is used to back-propagate the device information 126 to respective gateways. Device information is back-propagated to gateways based on zone information. For example, if courier 120 is connected to a zone 11 device, then courier 120 will provision a connection via connection module 124 with the gateway responsible for managing zone 11. Courier 120 will then back-propagate the device information for the zone 11 device to the gateway responsible for managing zone 11. In similar fashion, courier 220 will make connections with gateways of different zones to back-propagate specific device information for devices associated with those respective zones.

Mobile device 130 includes a processor 140, memory 132, a transmitter 134, a receiver 136, and one or more applications 138. Processor 140 includes a connection module 142 that determines a courier for connecting to the mobile device 230. Connection module 142 may use a round-robin DNS (Domain Name Service) scheme to determine a courier with which to connect. In other embodiments, a courier might be determined based on other information, such as geographical location, etc. Receiver 136 receives a zone identifier from the courier upon initially connecting with the courier. Encryption module 144 combines the zone identifier and the unique device identifier (UID) for the device to generate a device token. In various embodiments, encryption module 144 encrypts the token by applying a hashing algorithm (e.g., SHA-0, SHA-1, SHA-2, MD5, Whirlpool, or other hashing algorithms). Memory 132 stores the token. The token generated and encrypted by device 130 remains constant for mobile device 130 in various embodiments. In other words, the UID does not change and the zone identifier for the device does not change, either.

Once the token has been generated and encrypted, transmitter 234 transmits, or sends, the token to various provider applications (e.g., provider 102). The token may be transmitted when device 130 first calls provider 102. Provider 102 can use the token, or include the token, with any notification message so that it can be appropriately forwarded back to device 130.

Figure 2:
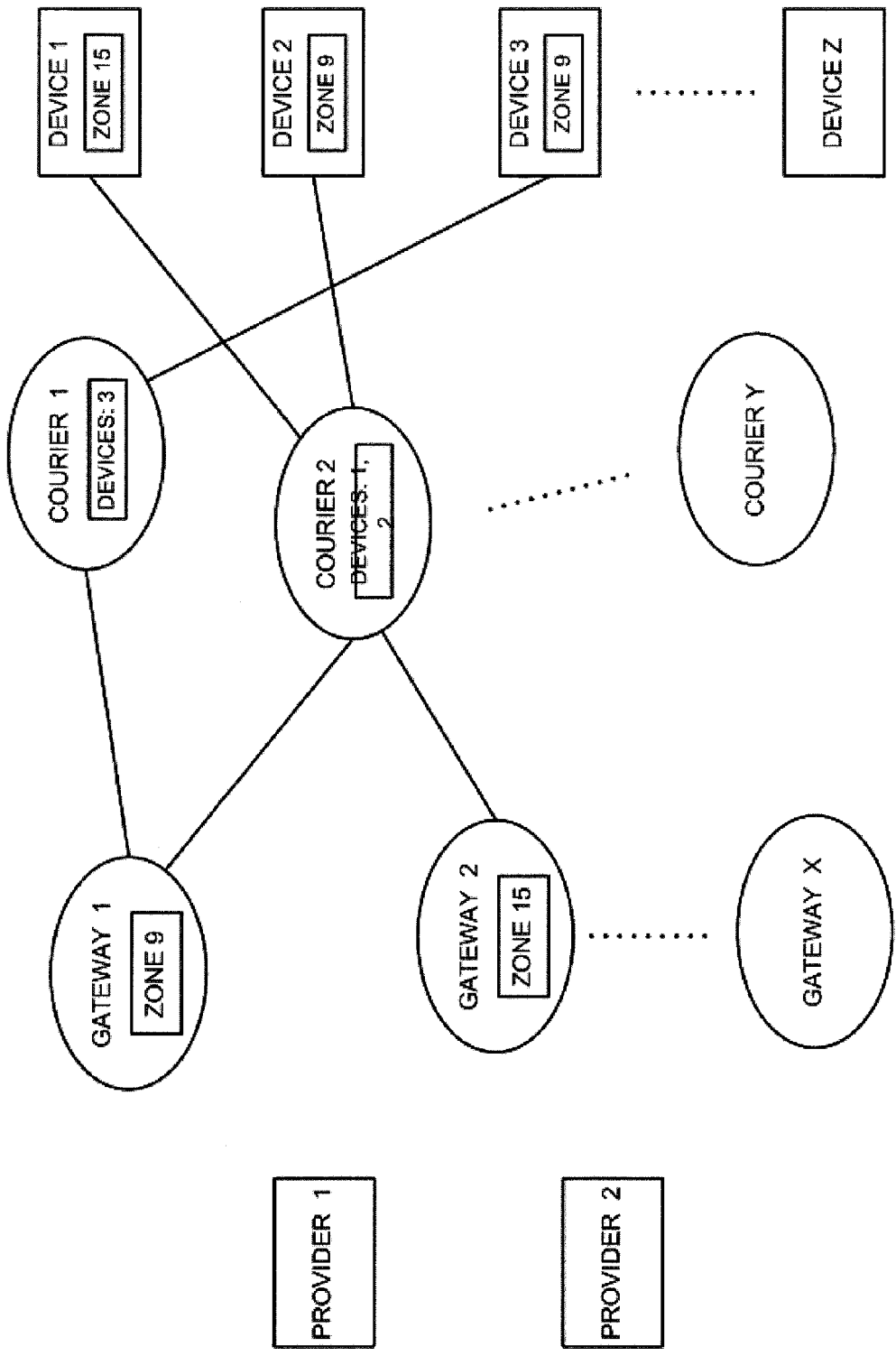
FIG. 2 is a block diagram, according to various embodiments.

FIG. 2 is a block diagram, according to various embodiments. In particular, FIG. 2 illustrates various examples of forwarding notification messages between providers and mobile devices. In one example, device 1 subscribes to a particular application managed by provider 1 and desires to receive notification messages for that application. Thus, device 1 calls provider 1 and transmits its device token to provider 1. As discussed above, that token includes an encrypted combination of the device's UID and its zone identifier. As shown in FIG. 2, device 1 has a zone identifier, zone 15. Thus, when provider 1 sends a notification message to device 1, it connects with one of the gateways in the system. In various embodiments, provider 1 connects to a gateway via round-robin DNS, although, in other embodiments, other connection schemes can be used. However, it is important to note that provider 1 does not need to connect to any particular gateway to successfully push a notification message to device 1. For example, if provider 1 usually connects with gateway 1 and sends a message intended for device 1, gateway 1 will look at the token accompanying the message and see that the message is intended for a device in zone 15. Given that gateway 1 is associated with zone 9, gateway 1 performs a routing table lookup (e.g., DNS lookup) and routes the message to gateway 2, which is responsible for zone 15.

Gateway 2 sends/forwards the message to courier 2 based on its device/courier mapping. Given that courier 2 is connected to device 1, courier 2 will have previously back-propagated the device information for device 1 to gateway 2 because device 1 belongs to zone 15 and gateway 2 is responsible for managing zone 15. Thus, gateway 2 is able to forward a message to courier 2, based on its device courier mapping; courier 2 is then able to lookup its connections and send the message to device 1.

Note in FIG. 2 that courier 2 is connected to both device 1 and device 2 and that each device belongs to a different zone. Thus, courier 2 back-propagates device information for each of the devices to the appropriate zone for the respective devices. In other words, courier 2 back-propagates device information for device 1 to gateway 2, given that gateway 2 manages zone 15. Courier 2 back-propagates device information for zone 2 to gateway 1, given that gateway 1 is responsible for managing zone 9. As mentioned above, back-propagation involves a courier establishing a connection with a gateway device and sending information as to its connections with various mobile devices (e.g., UIDs for the devices).

In another example, provider 2 wishes to send a notification message to device 3. Assume that provider 2 establishes a connection with gateway 1; thus, when provider 2 sends the message to gateway 1, gateway 1 determines that it is the appropriate gateway to forward the message, given that the message is intended for a zone 9 device (gateway 1 is responsible for zone 9). It can be seen from FIG. 2 that gateway 1 has connections with both courier 1 and courier 2, given that both courier 1 and courier 2 are each connected to a zone 9 device. However, based on the device/courier mappings back-propagated by courier 1 and courier 2, respectively, gateway 1 can perform a lookup of the mapping information and determine that the message should be forwarded to courier 1 in order to reach its destination at device 3. Once courier 1 receives the message, courier 1 forwards the message to device 3.

Figure 3:
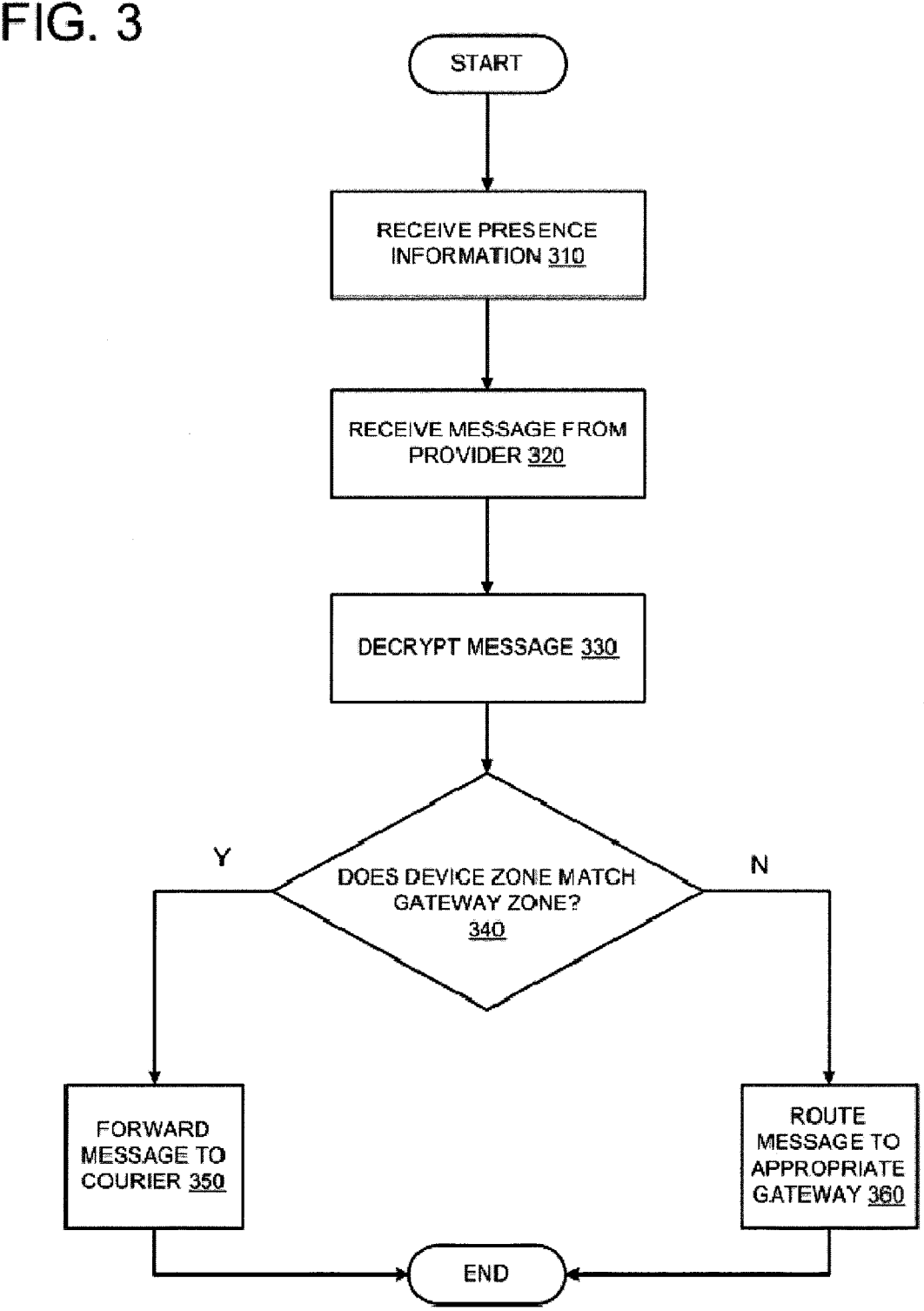
FIG. 3 is a flow diagram of operation, according to various embodiments.

FIG. 3 is a flow diagram of operation, according to various embodiments. Presence information for one or more mobile devices is dynamically received 310 from respective couriers connected to the mobile devices. The presence information for each mobile device includes a token comprised of a UID and a zone identifier. The term "dynamically receiving" as used herein refers to the concept that the presence information is not static. In other words, devices are not always connected to the same couriers and, therefore, gateways need to be dynamically updated to appropriately forward messages for devices to the correct couriers.

The notification message is received 320 at the first gateway device from a provider application. The notification message includes a mobile device token. The token is decrypted 330 (e.g., using a hashing algorithm) to determine the zone identifier associated with the message. It is then determined 340 whether the zone identifier in the message matches the zone currently managed by the gateway. If the zone identifier in the message does not match the zone managed by gateway, the gateway performs a routing table lookup and routes 360 the message to the appropriate gateway that manages the zone associated with the message. If the zone identifier in the message does match the zone managed by the gateway, the gateway refers to its device/courier mapping and forwards 350 the message to the appropriate courier.

Figure 4:
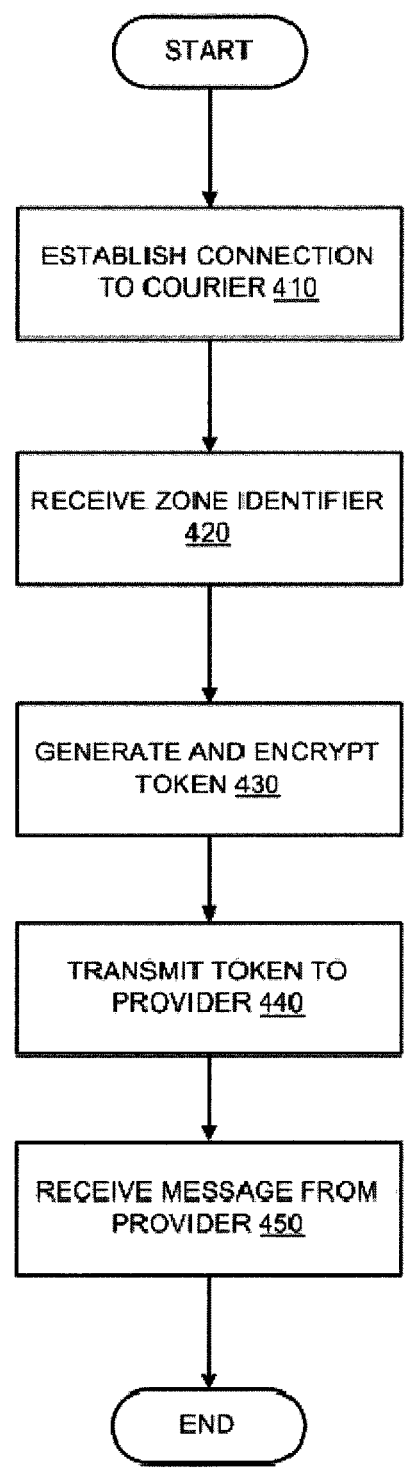
FIG. 4 is a flow diagram of operation, according to various embodiments.

FIG. 4 is a flow diagram of operation, according to various embodiments. A mobile device establishes 410 a connection to a courier device. The connection can be established by performing a round-robin DNS search, or other scheme, to establish a courier connection. A zone identifier is received 420 from the courier device upon connecting with the courier device. In various embodiments, the zone identifier is received only during an initial connection with the courier. In other words, a zone identifier is not received each time the device connects with a new courier. Instead, the zone identifier is received only the first time the device makes a connection of any kind with a courier.

A token for the device is generated and encrypted 430 via an encryption algorithm. The token includes both the device's unique identifier (UID) and the zone identifier. The encryption may be accomplished using a hashing algorithm, such as the hashing algorithms described previously. Once the token has been generated and encrypted, the token is transmitted 440 to a provider application. For example, the user of the mobile device might download, install, and/or subscribe to a particular application (e.g., Twitter). In some embodiments, when the mobile device next calls that provider application, it transmits the token to the provider 440. The transmittal of the token could also occur, for example, at the time the user subscribes and/or signs up for the application or service.

Subsequently, a message is received 450 from the provider application via a path that includes at least one gateway and a courier. In other words, the path might include one gateway, or more than one gateway. However, in various embodiments, the path will include only one courier. The forwarding path between gateway(s) and courier is determined based, at least in part, on the token that was originally transmitted from the device to the provider application.

Embodiments of a System and Method for Two-Way Push Notifications

Figure 5:
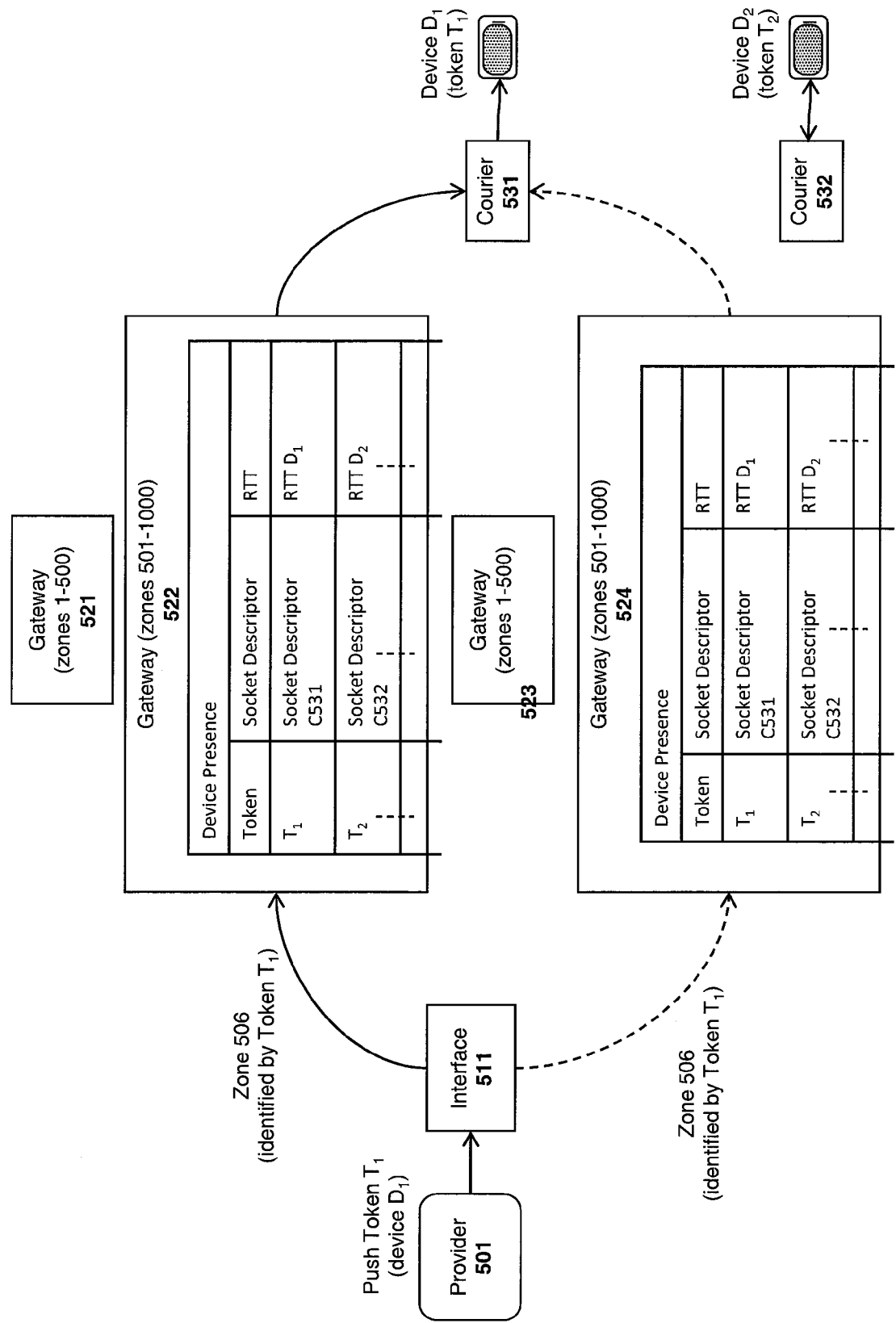
FIG. 5 illustrates one embodiment of a system architecture for selecting an optimal route over a gateway between a provider and a device.

As discussed above, in one embodiment, providers push notifications to mobile devices through gateways and couriers. As illustrated in FIG. 5, on one side of the architecture, the mobile devices $D_1$ and $D_2$ register to receive push notifications by establishing a secure connection to a particular courier 531, 532 (e.g., an SSL or TLS connection). As mentioned above, the couriers 531, 532 maintain network information for each device including, for example, a zone identifier and a unique device identifier (UID) for each device. The zone identifier identifies the particular zone to which the device is assigned which, in turn, identifies the gateway responsible for that zone.

In the particular example shown in FIG. 5, gateways 521 and 523 are responsible for routing push notifications for zones 1-500, and gateways 522-524 are responsible for routing push notifications for zones 501-1000. Multiple gateways are assigned to handle traffic for the same range of zones to provide redundancy, load balancing, and dynamic data traffic routing (as described herein). For example, if gateway 323 becomes inoperative, its data traffic (for zones 1-500) may be temporarily serviced by gateway 521. It should be noted, however, that the underlying principles of the invention are not limited to any particular number of gateways or any particular set of zone assignments.

In one embodiment, the different gateways may be located in different data centers. For example, gateways 521 and 522 may be located in a first data center and gateways 523 and 524 may be located in a second data center. Multiple redundant gateways may also be located within the same data center.

The underlying principles of the invention may be implemented within a single data center or across multiple data centers.

As illustrated in FIG. 5, a provider 501 may connect to a gateway through a particular interface 511, which performs an analogous function as couriers perform for mobile devices. Each interface 511 is a process through which providers 501 may securely transmit push notifications via SSL or TLS connections (i.e., as authorized by users via applications executed on the mobile devices). For example, a user may register to receive push notifications for a particular news topic or team, or for any other application-specific reason. The providers 501 generate these push notifications at appropriate times (e.g., periodically, in response to certain events, etc) based on user preferences.

A device's presence information is maintained on the gateways using the device's push token. Accordingly, when a push notification is received at a gateway directed to a particular push token, the gateway performs a lookup to determine there is a TCP socket descriptor associated with that push token. The socket descriptor provides the TCP socket information and other networking information needed to transmit the push notification to the appropriate courier 531 (i.e., the courier through which the device is currently connected).

A provider identifies a device using the device's push token (e.g., token $T_1$ in the example, which identifies device $D_1$). The push token contains a zone identifier indirectly identifying the gateway responsible for that zone (i.e., because each gateway is responsible for routing traffic for a specified range of zones). In the example shown in FIG. 5, token $T_1$ associated with device $D_1$ identifies zone 506, which is managed by two redundant gateways: gateways 522 and 524.

Thus, in the example shown in FIG. 5, push notifications may be transmitted to device $D_1$ through either of the gateways 522 or 524. In one embodiment of the invention, a round robin scheme is employed to balance the load between each of the gateways. Alternatively, or in addition, the quality of the communication channel between each gateway and each device may be monitored, and the gateway which provides a relatively higher quality connection may be selected. While various different measurements may be used to determine the "quality" of each gateway/device channel, in one embodiment of the invention, the quality is based on the measured round trip time for packets transmitted between each gateway and each device. Thus, as indicated in FIG. 5, a current round trip times (RTT) value associated with each device may be stored and subsequently used to select a particular route through a particular gateway. Given that each of the redundant gateways (521/523 and 522/524) may be located in different data centers, the selected gateway may tend to be in the same data center as the courier to which the device is currently attached (although the underlying principles of the invention are not limited to this particular implementation).

In one embodiment, an interface 511 of a provider 501 may initially make a domain name service (DNS) call to identify the network addresses (e.g., IP addresses) of each of the gateways needed to route a particular push notification. As previously described, a push token such as $T_1$ in our example identifies a zone, and that zone identifies a particular set of gateways (i.e., in our example, zone 506 identifies redundant gateways 522 and 524). Thus, the interface 511 may initially generate a DNS query of the form 6.gateway.push.apple.com (i.e., where the 6 in the first portion of the address identifies zone 6). The DNS server then responds to the interface query with the IP addresses of each of the gateways 522 and 523 responsible for zone 6. The interface 511 may then select one of the gateways to transmit the push notification.

In one embodiment, the interface 511 selects a particular gateway based on the current round trip time (RTT) associated with that gateway for the particular device to which the push is directed. For example, if gateway 522 has a relatively shorter RTT than gateway 524, then the interface 511 may select gateway 522. Alternatively, instead of the interface selecting a gateway with a relatively lower RTT, the network address of the gateway having the lowest RTT may be provided to the interface in response to the DNS query, or the set of network addresses may be sent to the interface in a prioritized order (with the network address of the gateway having the lowest RTT at the top of the prioritized list). In this embodiment, the DNS may be integrated with, or may communicate with, each of the gateways to retrieve and process the various RTT values. It should be noted, however, that the underlying principles of the invention are not limited to the specific manner in which a route is selected through a gateway. Various different configurations are possible and contemplated within the scope of the present invention.

In addition to routing based on RTT values, in one embodiment, a round robin scheme may also be implemented (e.g., for load balancing). For example, as long as the RTT values associated with each of the gateways is within a specified threshold, then either gateway may represent a viable routing option. In such a case, a gateway next in succession in the round robin scheme may be selected. In one embodiment, the round robin scheme may be performed with only those gateways having RTT values within the designated threshold. For example, if there are eight different possible gateways, but only two that have RTT values within the threshold, then the round robin scheme may be implemented between just the two gateways. This embodiment may be particularly advantageous when there are multiple gateways within the same data center responsible for the same zone or zone range. In such a case, the two gateways may have relatively similar RTT values, but these RTT values may be significantly lower than the remaining 6 gateways (which may be in different data centers). It should be noted, of course, that the underlying principles of the invention are not limited to any particular distribution of gateways between data centers.

In one embodiment, the RTT is not compared to a static threshold value. Rather, the differences between the various RTT values are compared and, if some are significantly lower than others beyond a specified threshold difference, then the gateways with the lower RTT values will be selected.

Figure 6:
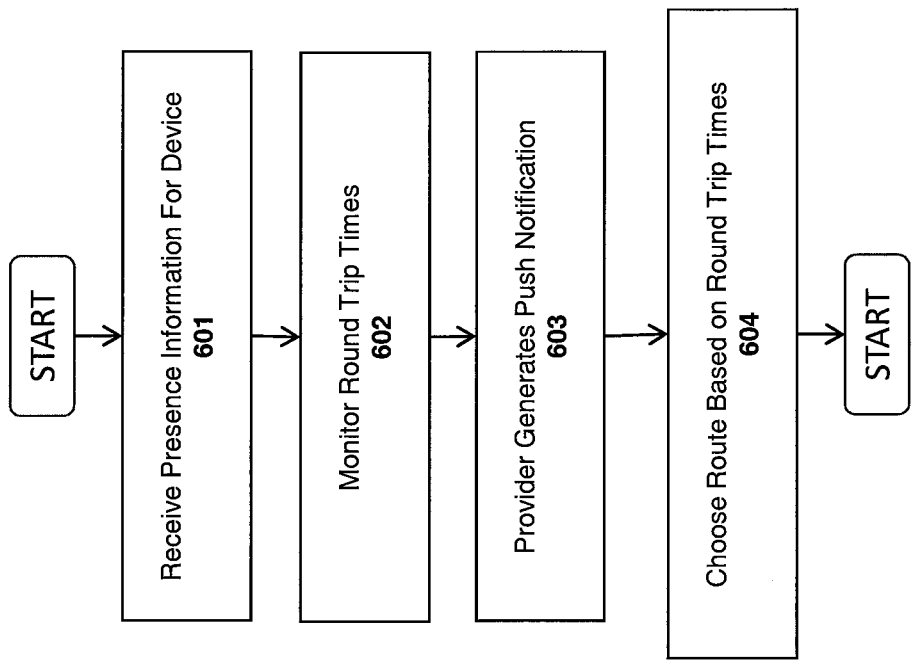
FIG. 6 illustrates one embodiment of a method for selecting an optimal route over a gateway between a provider and a device.

One embodiment of a method for routing push notifications is illustrated in FIG. 6. The method may be implemented within the context of the architecture shown in FIG. 5, but is not limited to any particular system architecture.

At 601, presence information is received from a particular mobile device, identifying the device to the push notification service (e.g., identifying the particular courier through which the device is connected). As mentioned above, in one embodiment, the device's token is associated with a socket descriptor identifying a TCP socket connecting each gateway to each courier which, in turn, maintains a connection with the device.

At 602, round trip times (RTTs) are monitored between each of the devices and each of the gateways. In one embodiment, the RTT values for each GW/device combination are continually updated within a table managed by the gateways, although such a configuration is not necessary for complying with the underlying principles of the invention.

At 603, a push notification is generated by a particular provider with which the user has subscribed. For example, a particular event may occur with respect to one of the user's favorite teams or a new version of software installed on the user's device may be made available.

At 604, a route is chosen to route the push notification through a particular gateway. As previously mentioned, the route may be indicated in response to a DNS query by the interface through which the provider is connected or, alternatively, may be made by the interface itself. Additionally, a limited round robin scheme may be implemented in combination with the RTT values (as discussed above). Regardless of the particular implementation, a gateway be selected to efficiently route the push notification to the device.

System and Method for Two-Way Push

The above discussion focused on a unidirectional implementation in which push notifications generated by providers are routed to mobile devices. In addition, one embodiment of the invention opens a push channel from devices to providers, thereby enabling bi-directional push communication between providers and devices. A bi-directional implementation may be used, for example, to generate feedback notifications to providers (e.g., using read receipts to detect when a user has read, acknowledged, or otherwise consumed a push notification).

Figure 7:
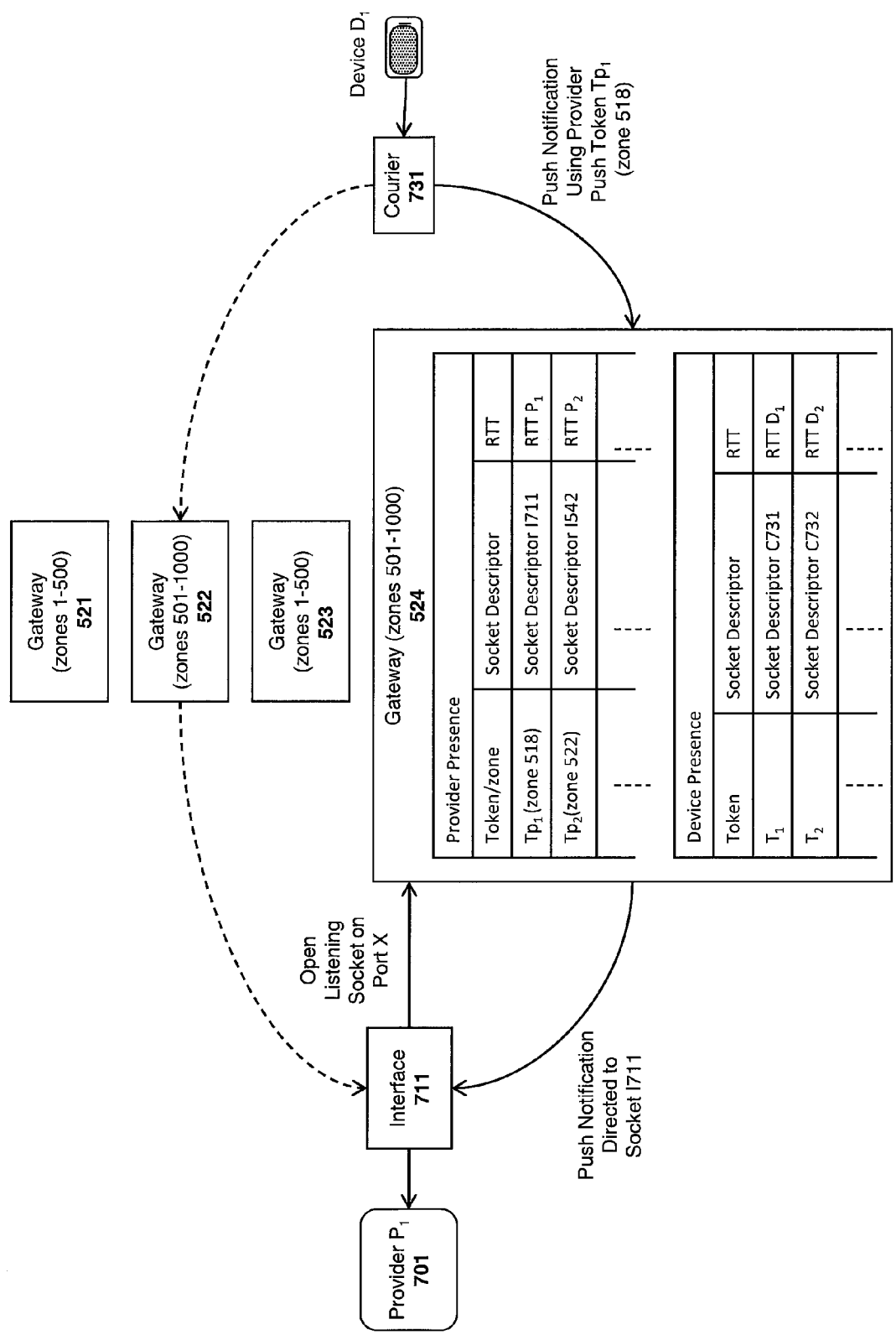
FIG. 7 illustrates one embodiment of a system architecture for providing two-way push notifications.

Referring to FIG. 7, in one embodiment, a provider opens a socket connection to a pre-specified TCP port via interface 711 in order to indicate that the provider is listening for notifications. In the example shown in FIG. 7, this port is generically referred to as "Port X," although any pre-specified port may be used. For authentication purposes, each provider is assigned a unique certificate which may be used to generate a zone number for the provider. In one embodiment, the provider provides its certificate to the interface, which then performs a hash on the certificate (e.g., an SHA-1 hash) to generate a provider token (analogous to the device token) which includes a zone number—zone 518 in the example shown in FIG. 7. This token/zone number may then be specified by applications on mobile devices (or by other services) to transmit push notifications to each respective provider.

Consequently, just as couriers register the presence of devices with gateways (as discussed above), each provider may register its presence within the gateway responsible for its zone. As indicated in FIG. 7, the provider's presence data is stored on a table on each gateway responsible for the provider's assigned zone. As indicated, the presence information may include the round trip times (RTTs) of packets transmitted between the gateway and each respective provider. The RTT values associated with providers may then be used to select among each of the redundant gateways for a zone, just as the RTT values for couriers are used to select gateways as described above. It should be noted that, although not illustrated in FIG. 7, the same provider presence and device presence as shown for gateway 524 may be stored within gateway 522.

A device transmitting a push notification to a particular provider identifies that provider with the provider's token, which identifies the gateway using the zone associated with that token. In one embodiment, the courier to which the device is connected initially extracts the provider's zone number from the provider's token and generates a DNS query using the zone number to identify the IP addresses of the gateways responsible for that zone (e.g., 518.gateway.push-.apple.com, where 518 identifies the zone). The DNS functionality may be implemented within the same hardware platforms as the gateways or may use separate, dedicated hardware. Multiple IP addresses may then be returned in response to the DNS queries for multiple redundant gateways. In one embodiment, these IP addresses may be prioritized using a round robin scheme, RTT values or a combination of the two (as discussed above). For example, if a set of gateways have RTT values significantly lower than other gateways for this particular provider (e.g., lower by a specified threshold amount), then the round robin scheme may be implemented on this set of gateways.

Regardless of how the gateways are prioritized, the selected gateway uses the socket descriptor data for the interface to which the provider is connected to transmit the push notification to the provider. The provider may then read the contents of the push notification and respond in any application-specific manner. For example, if the push notification is a read receipt, then the provider may store the information contained in the read receipt within a user database. Of course, the underlying principles of the invention are not limited to any particular use of the reverse-push functions described herein. Moreover, the same provider may be connected over several different gateways to several different interfaces while still complying with the underlying principles of the invention.

Figure 8:
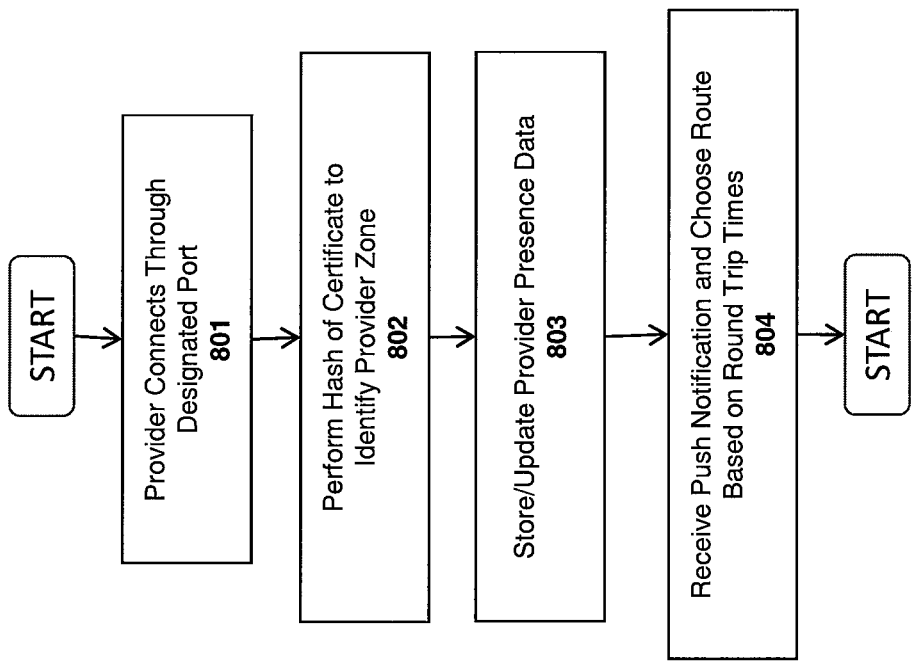
FIG. 8 illustrates one embodiment of a method for providing two-way push notifications.

FIG. 8 illustrates a method according to one embodiment of the invention. The method may be executed within the context of the architecture shown in FIG. 7, but is not limited to any particular architecture.

At 801, the provider connects to the push notification service via a designated port (e.g., Port X in the example shown in FIG. 7) and provides its certificate. At 802, a hash of the certificate is performed to identify the zone for the provider. At 803, the provider's presence data (e.g., TCP socket data and current status) is stored within the gateways responsible for this particular zone. At 804, a push notification is received from one of the devices and the route through a particular gateway is selected based on the current quality of the socket connections over each of the gateways (e.g., as identified by round trip times, in one embodiment). Finally, at 805, the reverse push notification is received by the provider, which may act on the receipt of the reverse push notification in any number of pre-specified ways.

Embodiments of the invention may include various steps as set forth above. The steps may be embodied in machine-executable instructions which cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable program code. The machine-readable medium may include, but is not limited to, floppy diskettes, optical disks, CD-ROMs, and magneto-optical disks, ROMs, RAMs, EPROMs, EEPROMs, magnetic or optical cards, or other type of media/machine-readable medium suitable for storing electronic program code.

Throughout the foregoing description, for the purposes of explanation, numerous specific details were set forth in order to provide a thorough understanding of the invention. It will be apparent, however, to one skilled in the art that the invention may be practiced without some of these specific details. For example, it will be readily apparent to those of skill in the art that the functional modules and methods described herein may be implemented as software, hardware or any combination thereof. Moreover, although embodiments of the invention are described herein within the context of a mobile computing environment (i.e., using mobile devices 120-123; 601-

603), the underlying principles of the invention are not limited to a mobile computing implementation. Virtually any type of client or peer data processing devices may be used in some embodiments including, for example, desktop or workstation computers. Accordingly, the scope and spirit of the invention should be judged in terms of the claims which follow.

We claim:

1. A method for dynamically routing push notifications to a mobile device comprising:
   maintaining a provider presence table on each of a first and second gateways, each provider presence table comprising presence information for one or more devices, the presence information comprising an indication whether each device is currently connected and an indication of a network socket to which each device is currently connected;
   receiving an indication that a first user of a first device has selected to receive push notifications from a first provider;
   monitoring presence information associated with the first user, the presence information indicating whether the first device is currently connected to a wireless network and a current network location of the first device;
   monitoring channel quality for packets transmitted between the first device and the first gateway and between the first device and the second gateway, the monitoring comprising dynamically updating the channel quality based on one or more current conditions for packets transmitted between the first device and the first gateway and between the first device and the second gateway;
   receiving a push notification directed to the first user from the first provider; and
   selecting one of the first and the second gateways to transmit the push notification to the first device based on the monitored channel quality.

2. The method as in claim 1 wherein monitoring channel quality comprises monitoring round trip times for packets transmitted between the first device and a first gateway and between the first device and a second gateway.

3. The method as in claim 1 wherein if the channel quality measured between the first device and the first gateway is within a specified threshold amount of the channel quality measured between the first device and a second gateway, then employing a round robin scheme to select between the first gateway and the second gateway for transmitting the push notification to the first device.

4. The method as in claim 1 further comprising:
   receiving a domain name service (DNS) query from the first provider for the push notification.

5. The method as in claim 1, wherein each provider presence table further comprises a channel quality value associated with the connection between a corresponding gateway and each respective device.

6. The method as in claim 2 further comprising:
   selecting the gateway which has a relatively lower round trip time associated therewith.

7. The method as in claim 4 wherein selecting comprises providing the network address of one of the first and second gateways to the provider in response to the DNS query based on the measured channel quality.

8. A non-transitory machine-readable medium having program code stored thereon which, when executed by one or more machines, causes the machines to perform the operations of:
   maintaining a provider presence table on each of a first and second gateways, each provider presence table comprising presence information for one or more devices, the presence information comprising an indication whether each device is currently connected and an indication of a network socket to which each device is currently connected;
   receiving an indication that a first user of a first device has selected to receive push notifications from a first provider;
   monitoring presence information associated with the first user, the presence information indicating whether the first device is currently connected to a wireless network and a current network location of the first device;
   monitoring channel quality for packets transmitted between the first device and the first gateway and between the first device and the second gateway, the monitoring comprising dynamically updating the channel quality based on one or more current conditions for packets transmitted between the first device and the first gateway and between the first device and the second gateway;
   receiving a push notification directed to the first user from the first provider; and
   selecting one of the first and the second gateways to transmit the push notification to the first device based on the monitored channel quality.

9. The machine-readable medium as in claim 8 wherein monitoring channel quality comprises monitoring round trip times for packets transmitted between the first device and a first gateway and between the first device and a second gateway.

10. The machine-readable medium as in claim 8 wherein if the channel quality measured between the first device and the first gateway is within a specified threshold amount of the channel quality measured between the first device and a second gateway, then employing a round robin scheme to select between the first gateway and the second gateway for transmitting the push notification to the first device.

11. The machine-readable medium as in claim 8 comprising additional program code to cause the machines to perform the additional operations of:
    receiving a domain name service (DNS) query from the first provider for the push notification.

12. The machine-readable medium as in claim 8, wherein each provider presence table further comprises a channel quality value associated with the connection between a corresponding gateway and each respective device.

13. The machine-readable medium as in claim 9 comprising additional program code to cause the machines to perform the additional operations of:
    selecting the gateway which has a relatively lower round trip time associated therewith.

14. The machine-readable medium as in claim 11 wherein selecting comprises providing the network address of one of the first and second gateways to the provider in response to the DNS query based on the measured channel quality.

15. A system, comprising:
    a processor; and
    a memory;
    wherein the processor and the memory perform operations for:
    maintaining a provider presence table on each of a first and second gateways, each provider presence table comprising presence information for one or more devices, the presence information comprising an indication whether each device is currently connected and an indication of a network socket to which each device is currently connected;

receiving an indication that a first user of a first device has selected to receive push notifications from a first provider;

monitoring presence information associated with the first user, the presence information indicating whether the first device is currently connected to a wireless network and a current network location of the first device;

monitoring channel quality for packets transmitted between the first device and the first gateway and between the first device and the second gateway, the monitoring comprising dynamically updating the channel quality based on one or more current conditions for packets transmitted between the first device and the first gateway and between the first device and the second gateway;

receiving a push notification directed to the first user from the first provider; and selecting one of the first and the second gateways to transmit the push notification to the first device based on the monitored channel quality.

16. The system as in claim 15 wherein monitoring channel quality comprises monitoring round trip times for packets transmitted between the first device and a first gateway and between the first device and a second gateway.

17. The system as in claim 15 wherein if the channel quality measured between the first device and the first gateway is within a specified threshold amount of the channel quality measured between the first device and a second gateway, then employing a round robin scheme to select between the first gateway and the second gateway for transmitting the push notification to the first device.

18. The system as in claim 15 comprising additional program code to cause the processor to perform the additional operations of:

receiving a domain name service (DNS) query from the first provider for the push notification.

19. The system as in claim 15, wherein each provider presence table further comprises a channel quality value associated with the connection between a corresponding gateway and each respective device.

20. The system as in claim 16 comprising additional program code to cause the processor to perform the additional operations of:

selecting the gateway which has a relatively lower round trip time associated therewith.

21. The system as in claim 18 wherein selecting comprises providing the network address of one of the first and second gateways to the provider in response to the DNS query based on the measured channel quality.

* * * * *